Nov. 7, 1967  J. E. KIENEL  3,351,033
APPARATUS AND METHOD FOR SEAMING HOSIERY BLANKS
Original Filed April 26, 1963  10 Sheets-Sheet 5

*Fig-5*

INVENTOR:
JOSEPH E. KIENEL
BY Eaton, Bell, Hunt & Seltzer
ATTORNEYS

Nov. 7, 1967     J. E. KIENEL     3,351,033
APPARATUS AND METHOD FOR SEAMING HOSIERY BLANKS
Original Filed April 26, 1963     10 Sheets-Sheet 6

INVENTOR:
JOSEPH E. KIENEL
BY
Eaton, Bell, Hunt & Seltzer
ATTORNEYS

Nov. 7, 1967          J. E. KIENEL          3,351,033
APPARATUS AND METHOD FOR SEAMING HOSIERY BLANKS
Original Filed April 26, 1963          10 Sheets-Sheet 8

FIG-11

FIG-12

# United States Patent Office 3,351,033
Patented Nov. 7, 1967

3,351,033
APPARATUS AND METHOD FOR SEAMING HOSIERY BLANKS
Joseph E. Kienel, Acworth, Ga. 30101
Continuation of application Ser. No. 275,956, Apr. 26, 1963. This application Dec. 23, 1966, Ser. No. 604,490
34 Claims. (Cl. 112—2)

ABSTRACT OF THE DISCLOSURE

A method of and apparatus for seaming the toe forming portion of tubular hosiery blanks and then everting the seamed tubular hosiery blanks wherein the tubular hosiery blank is drawn welt first onto an elongate hollow form, the toe forming portion is seamed while the hosiery blank is on the form, and the seamed hosiery blank is then everted by being drawn seamed end first through the form by suction currents created therein. A more specific method of and apparatus for seaming the toe forming portions of tubular hosiery blanks, wherein a plurality of the tubular hosiery blanks are supportingly moved in a predetermined serial arrangement to and through a seaming station and the toe forming portions are successively seamed, and then the seamed hosiery blanks are successively removed from the serial arrangement with or without eversion thereof.

---

This application is a continuation of application Ser. No. 275,956, filed Apr. 26, 1963.

The present invention relates to an apparatus for and a method of closing one end of circular knit hosiery blanks, which closed end will correspond to the foot portion of the finished hose, and more particularly in most instances to the toe portion thereof.

There are presently two general types of circular knit hosiery blanks being manufactured. One of these types has the toe portion thereof defined by a pair of fashioned gussets which form a toe pocket and which are formed during knitting of the hosiery blanks. This type of hosiery blanks generally has a plurality of complete circular courses knit after formation of the fashioned gussets which are commonly termed "looper courses."

For many years, it has been conventional practice to close the toe portions of this type of hosiery blanks by an operation generally termed "a looping operation." During this looping operation, the hosiery blanks are placed on a looper dial of a looping machine by positioning the needle loops of each wale of the first looper course on one side of the opening to be closed on points of the looper dial and then positioning corresponding loops of the first looper course on the other side of the opening on the same points so that the fabric portions formed by the looper courses are flattened into juxtaposed relation. The looper dial carries the thusly positioned hosiery blanks to a cutter which cuts away all of the looper courses except the course positioned on the points of the looper dial and then a thread carrying needle passes through each pair of loops on the points of the looper dial. This needle cooperates with another stitch forming instrumentality for forming an overedge seam along this looper course to close the toe portion.

Such a looping operation has several deficiencies, the foremost of which is that a highly skilled looper operator is required for each looping machine for positioning the loops of the looper course on the points of the looper dial. These operators require a long and extensive training program before being capable of operating a looping machine. In addition, many years of on-the-job training is required before peak efficiency is achieved. Even with a highly skilled operator, the looping operation is very tedious and time-consuming and causes a great mental and physical fatigue of the operator. Still further, the production of a looping machine is quite low and therefore the cost of the looping operation is very high.

With the advent of improved seaming machines capable of forming a loose overedge seam, it has become relatively common practice to close the toe portions of this type of hosiery blanks by manually directing and guiding each of the blanks to such a seaming machine. Even though this seaming operation has resulted in increased production in the closing of the toe portions of circular knit hosiery blanks, the same still requires a highly skilled, experienced operator for each seaming machine for manually directing the hosiery blanks through the seaming machine. Thus, the seaming operation, like the looping operation, is relatively tedious and time-consuming and is therefore relatively expensive.

Another type of circular knit hosiery blank is commonly referred to as "tube" hosiery, wherein the blank is of tubular form throughout and without any fashioned gussets defining a toe pocket as in the first type described above. One end portion of the tube hosiery blank, i.e., that end corresponding to the foot portion of a finished hose, is then closed by a curved seam extending laterally and longitudinally of the hosiery blank such that the seam will be disposed longitudinally of and normally beneath the foot portion of the hose when finished.

Heretofore, it has been common practice to close this one end of tube-type hosiery blanks by manually directing and guiding each of the hosiery blanks to a seaming machine of the type mentioned above. This seaming of the tube-type hosiery blanks also requires a highly skilled and experienced operator for each seaming machine with the same attendant problems as set forth above. Even with such a skilled and experienced operator, there are frequent variances between the successive seaming operations on successive hosiery blanks. In this regard, it can be readily appreciated that it is extremely difficult to achieve the same curvature of the seams in successive seaming operations even assuming that the starting points and ending points on the successive hosiery blanks are identical. In practice, however, it has been applicant's experience that there is frequently variance between the starting and ending points on the hosiery blanks during successive seaming operations as well as variance in the degree of curvature of such seams.

Further, it is common practice to close the ends of the hosiery blanks with the hosiery blanks wrong side out and the blanks are everted after seaming to present the same right side out wherein the seams or looper lines have the most pleasing appearance. Also, such everting of the hosiery blanks positions the loose terminal ends of the seams or looper lines inside the seamed hosiery blanks.

Heretofore, this everting of the seamed hosiery blanks has been carried out by a separate operation removed from the looper or seaming machine. This separate everting operation requires additional manual handling of the hosiery blanks and an additional operator or operators which considerably increases the manufacturing cost of the hose.

It is therefore an object of the present invention to provide an improved apparatus for and method of seaming circular knit hosiery blanks of the types heretofore described which avoid the requirement for a highly skilled and experienced operator and wherein less variance between successively seamed hosiery blanks occurs.

Briefly stated, this object is achieved by providing novel hosiery blank feeding means in conjunction with a seaming machine to direct a plurality of successively arranged hosiery blanks to and through the seaming machine in proper positional relationship for forming the desired seams. This arrangement of apparatus only necessitates an operator properly placing the hosiery blanks on the hosiery blank feeding means, which may be quickly and easily done, and avoids the heretofore tedious practice of the operator manually directing the hosiery blanks to and guiding the same through the seaming machine. Thus, the duties of the operator are so drastically lessened that it is possible for one operator to properly attend more than one seaming machine which obviously is an important saving to a hosiery mill.

A more specific object of the present invention is to seam circular knit hosiery blanks in the manner described and wherein the hosiery blanks are everted immediately following seaming thereof without any additional manual handling. Thus, the aforementioned conventional separate everting operation is obviated and therefore a further reduction in personnel may be effected which obviously results in further savings in the manufacture of hosiery.

Some of the objects of the invention having been stated, other objects will appear as the description proceeds, when taken in connection with the accompanying drawings, in which:

Figure 1:
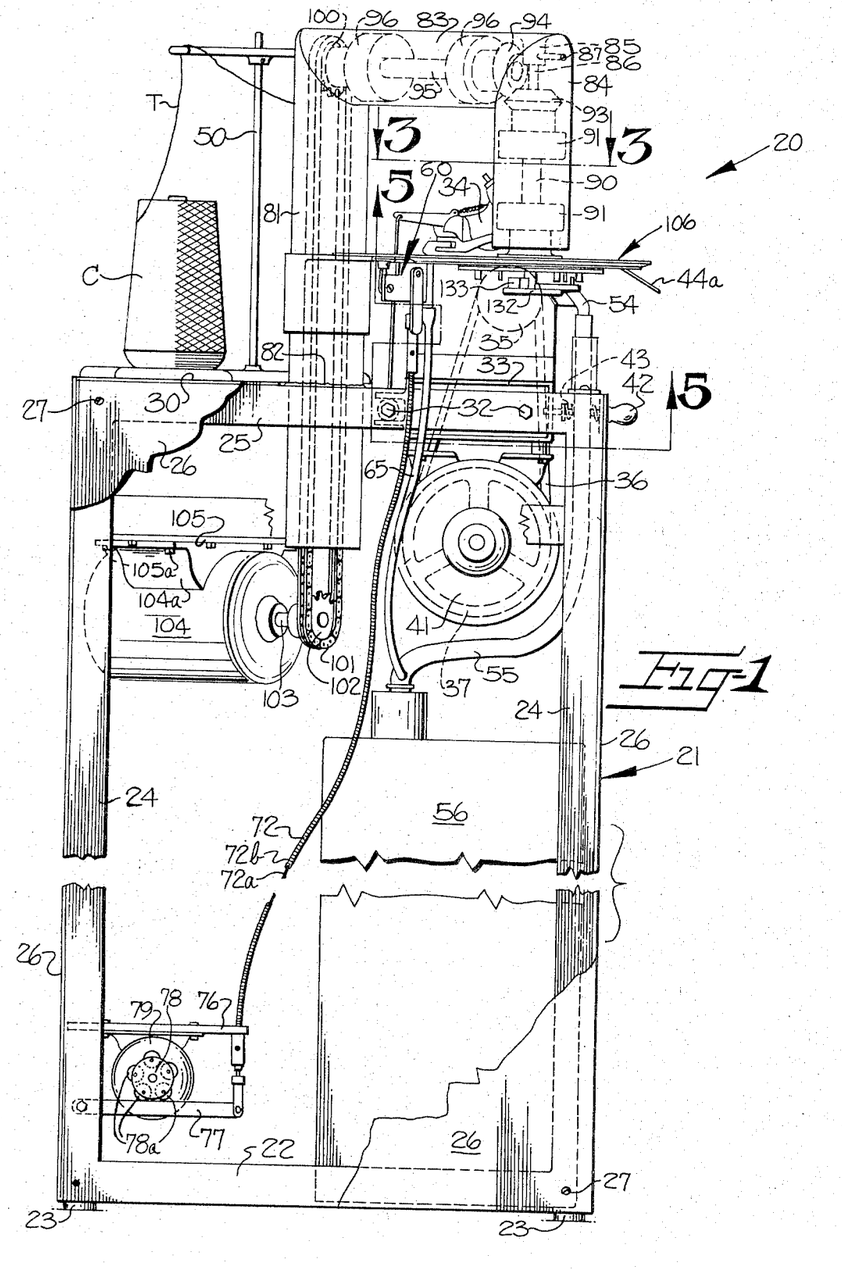
FIGURE 1 is a side elevational view of a hosiery seaming apparatus incorporating the features of the present invention with portions broken away and portions removed for clarity.
Figure 2:
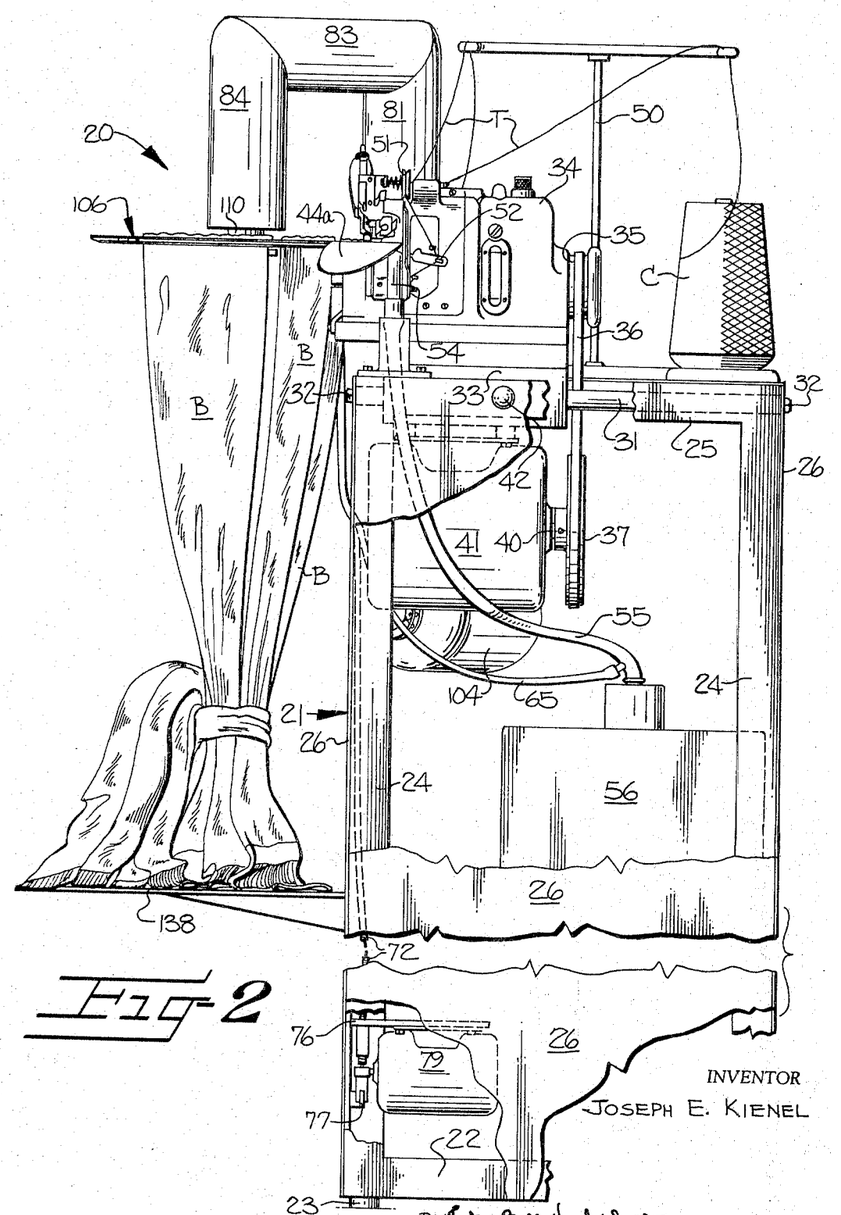
FIGURE 2 is a front elevational view of the apparatus shown in FIGURE 1 with portions broken away and removed for clarity and illustrating the manner of use of the apparatus with a bundle of hosiery blanks.

Referring now specifically to the drawings and more particularly to FIGURES 1 and 2, there is shown an apparatus 20 incorporating the features of the present invention. Apparatus 20 includes a base 21 of any suitable construction adapted to be supported on any suitable supporting surface.

Preferably, base 21 includes a bottom frame 22 having legs 23 mounted thereon for supporting base 21 on the supporting surface. Upstanding corner frame members 24 are mounted on bottom frame 22 and in turn support a top frame 25. Preferably, the bottom frame 22, corner frame members 24 and top frame 25 are formed of suitable angle material and are suitably enclosed by sheets 26 of any suitable material, such as sheet metal, connected to the frame by suitable bolts or rivets 27. Top frame 25 has a top member 30 mounted thereon which is of less width than top frame 25 such that the top member covers only a portion thereof and the remainder is open.

A pair of spaced apart bars 31 are mounted at opposite ends on top frame 25 by suitable bolts 32 and slidably mount a carriage 33 thereon which extends upwardly therefrom through the open portion of top frame 25. An overedge seaming machine 34 is mounted on the upper portion of carriage 33 for sliding movement therewith and is preferably a conventional overedge seaming machine of the types which are presently being made by Merrow Machine Company, Hartford, Connecticut, and identified as Model Nos. M–4D–60 or M–4D–45, or of the type which is presently being manufactured and sold by Singer Sewing Machine Company and which is identified as Type 246SV12.

Sewing machine 34 includes a pulley 35 (FIGURE 2) which supports one end of a belt 36 which is supported at its other end by a drive pulley 37. Drive pulley 37 is mounted on the output shaft 40 of a suitable motor 41 which in turn is suitably mounted on the lower portion of carriage 33 for movement therewith.

A latch pin 42 (FIGURE 1) is slidably carried by base 21 and is adapted to have its inner end disposed in suitable openings (not shown) in carriage 33 for releasably latching carriage 33 in a first position, as shown in FIGURE 2, in which seaming machine 34 will be in operative position and a second position spaced to the right from the position shown in FIGURE 2 in which the seaming machine will be in inoperative position for maintenance of seaming machine 34 and other sundry reasons. A spring 43 surrounds pin 42 and biases the same toward latching engagement with carriage 33.

Seaming machine 34 includes a throat plate 44 (FIGURE 3) which serves to support the portions of hosiery blanks B to be seamed. Throat plate 44 includes a forward portion 44a (FIGURE 4) which is downwardly angled to guide the hosiery blanks into position to be seamed. Also, throat plate 44 has the side thereof opposite from the remaining portion of seaming machine 34 cut away along a curved line as indicated at 44b (FIGURE 3) for reasons to be presently described.

Preferably, seaming machine 34 includes two needles 45 (FIGURE 4) which cooperate with suitable loopers (not shown) therebeneath to form overedge seams S (FIGURE 3) in the hosiery blanks B successively fed thereto. As is conventional, seaming machine 34 also includes a presser foot 46 which cooperates with throat plate 44 for receiving the hosiery blanks therebetween for securely holding the same during the formation of the seams S and also includes a knife 47 (FIGURE 4) for severing excess material from the hosiery blanks B prior to formation of the seams S.

Figure 4:
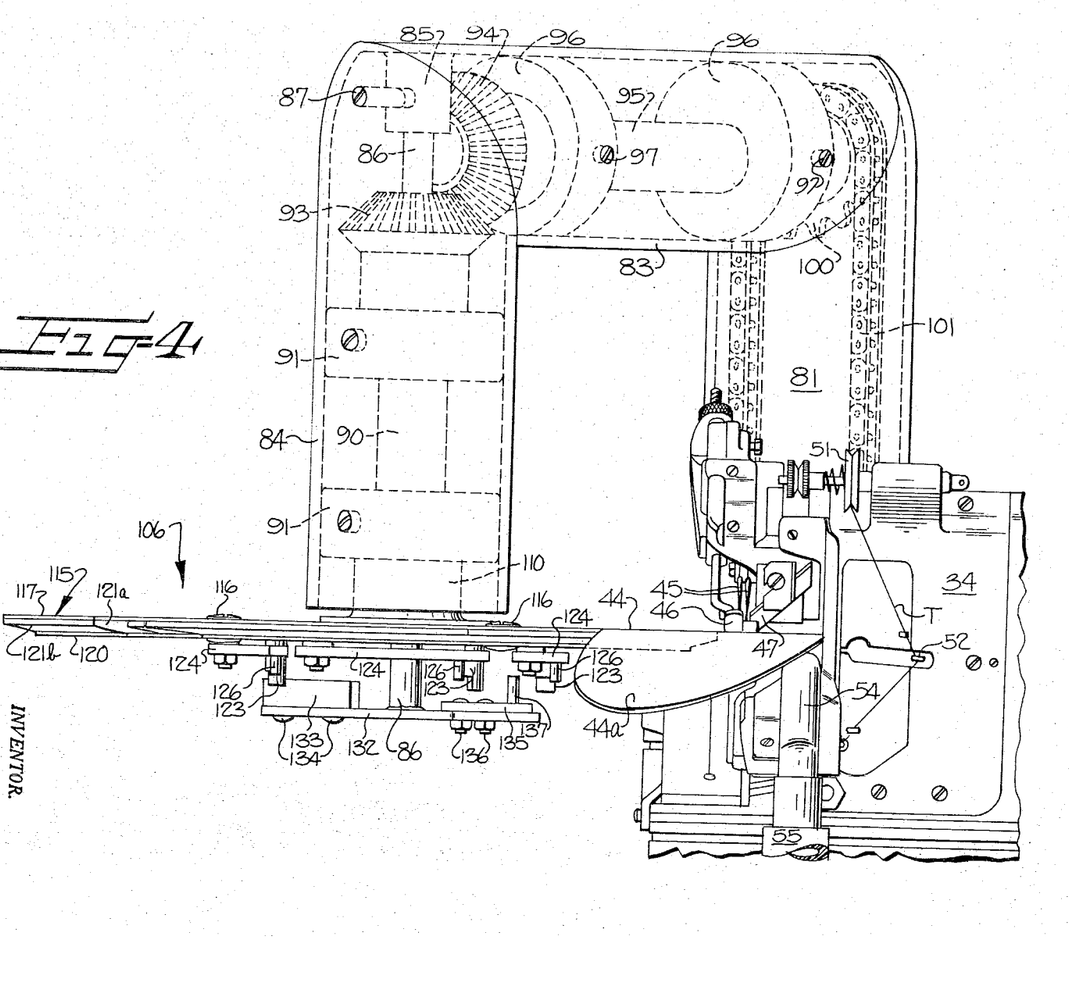
FIGURE 4 is an enlarged fragmentary elevational view of the portion of the apparatus shown in the upper left-hand portion of FIGURE 2 with the hosiery blanks not shown therein.

Suitable sewing threads T are supplied to needles 45 and the other stitch forming instrumentalities of seaming machine 34 from thread supply cones C (only one of which is shown) by means of a thread guide stand 50 mounted on top member 30 of base 21 and thread tension and take-up mechanisms 51 and 52 respectively (FIGURES 1, 2 and 4). It is noted that seaming machine 34 preferably has the conventional feed dog mechanism either omitted or inactivated in view of other feeding means to be presently described.

Figure 6:
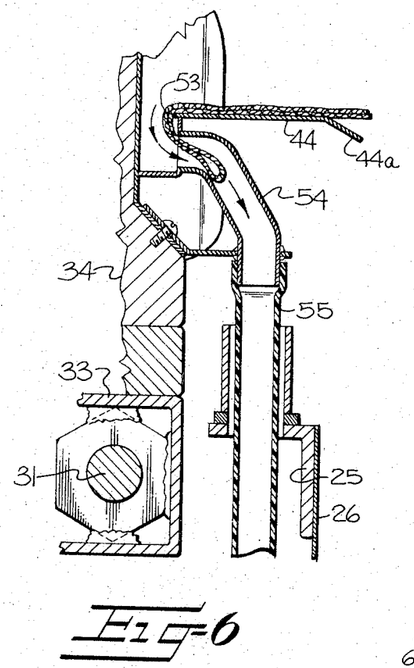
FIGURE 6 is a fragmentary sectional view taken substantially along line 6—6 in FIGURE 3.
Figure 7:
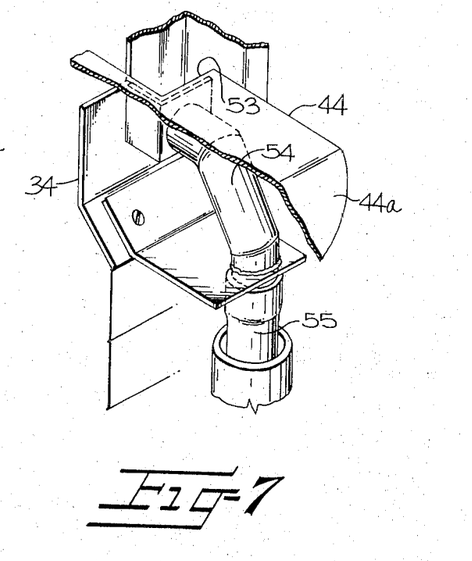
FIGURE 7 is a fragmentary isometric view of the apparatus shown in FIGURE 6 with portions broken away and in section for clarity in viewing the elements therebeneath.

Preferably, throat plate 44 has an opening 53 (FIGURES 3 and 7) formed therein adjacent knife 47 and a conduit 54 (FIGURES 6 and 7) is connected to throat plate 44 in communication with opening 53. A hose 55 is connected at one end to conduit 54 and is connected at its other end to a suitable source of vacuum or suction 56 (FIGURES 1 and 2). Vacuum source 56 serves to pull a suction on opening 53 in throat plate 44 through hose 55 and conduit 54 to remove the excess material being severed from the hosiery blanks B by knife 47.

A work support plate 57 (FIGURE 3) extends rearwardly from throat plate 44 of seaming machine 34 and serves to support the seamed portions of the hosiery blanks B. Plate 57 has one side thereof cut away along a curved line indicated at 57a having substantially the same radius as curved portion 44b of throat plate 44. Work support plate 57 has an opening 58 (FIGURES 3 and 8) therein at a point spaced from the stitch forming instrumentalities of seaming machine 34 and spaced inwardly from curved portion 57a in such a position that the seams S of the seamed hosiery blanks will pass thereover.

Figure 3:
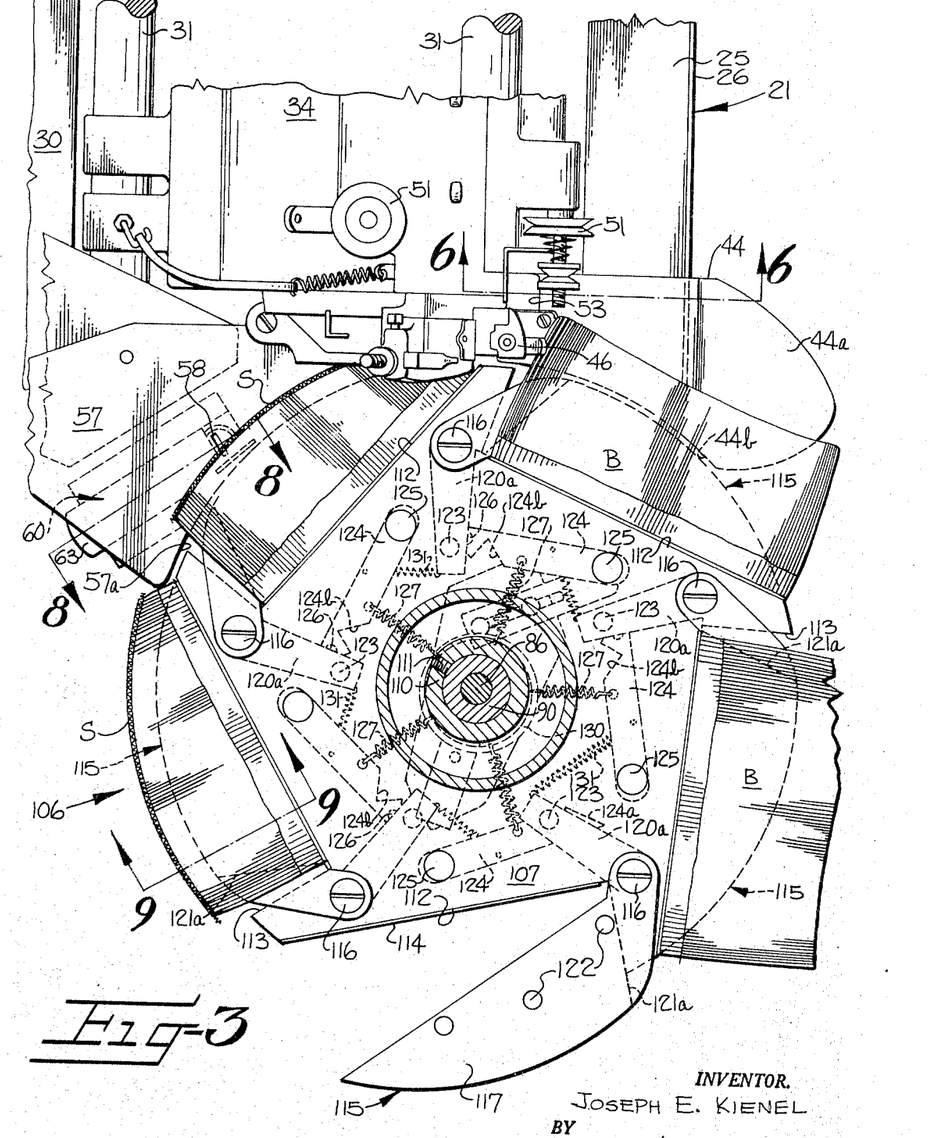
FIGURE 3 is an enlarged fragmentary sectional view taken substantially along line 3—3 in FIGURE 1.
Figure 8:
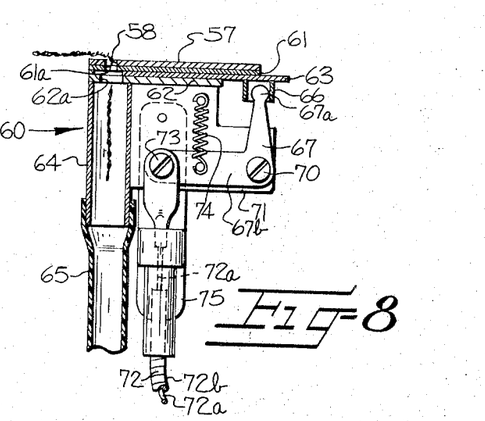
FIGURE 8 is a fragmentary sectional view taken substantially along line 8—8 in FIGURE 3.

A seaming chain severing device 60 (FIGURE 8) is disposed beneath work support plate 57 at opening 58 and includes a top plate member 61 mounted on the under surface of work support plate 57 which has an opening 61a therethrough in alinement with opening 58. A base plate 62 is mounted on top plate member 61 and defines therewith a channel in which is disposed a slidable cutter member 63 (FIGURES 3 and 8). Base plate 62 has an opening 62a therethrough in alinement with the openings 58 and 61a and has connected thereto a conduit 64 which communicates with opening 62a and extends downwardly therefrom. A hose 65 is connected at one end to conduit 64 and is connected at its other end to hose 55 immediately adjacent vacuum source 56. Therefore, a suction is pulled by vacuum source 56 on opening 58, to draw the seaming stitch chains on the seamed hosiery blanks passing over work support plate 57 downwardly through the openings 58, 61a and 62a into conduit 64.

Slidable cutter member 63 is reciprocated in the channel between top plate member 61 and base plate 62 to cooperate with top plate member 61 for severing any seaming stitch chains in the opening 61a therein by means of a socket 66 mounted on cutter member 63 which has a ball end portion of one leg 67a of a bell crank lever 67 disposed therein. Bell crank lever 67 is pivotally mounted by a suitable screw 70 at the juncture of the legs thereof on a bracket 71 mounted on base plate 62 and has the other leg 67b thereof connected to one end of a wire 72a of a Bowden wire cable 72 by a screw 73. A tension spring 74 is connected at one end to leg 67b of bell crank lever 67 and is connected at its other end to bracket 71 for biasing cutter member 63 to inoperative position or to the right as seen in FIGURE 8.

Bowden wire cable 72 has its sheath 72b anchored at one end to a bracket 75 mounted on bracket 71 and anchored at its other end by a bracket 76 mounted on an upright frame member 24. The other end of wire 72a is connected to a lever 77 pivotally mounted on the frame member 24. Lever 77 is disposed below and in engagement with a rotatable cam 78 mounted on the output shaft of a motor 79. Cam 78 has a plurality of cam portions 78a disposed around the periphery thereof and lever 77 is moved downwardly about its pivot upon each cam portion 78a engaging the same. It is noted that spring 74 biases lever 77 into engagement with cam 78 through bell crank lever 67 and wire 72a.

A hosiery blank supporting and feeding means generally indicated at 80 (FIGURE 2) is provided for seaming machine 34 and includes a generally vertical tubular standard 81 (FIGURE 1) which extends through a cutout in the top plate 30 of base 21 and is mounted on top frame 25 by any suitable means such as welding 82. One end of an overhanging arm 83, also of tubular construction, is mounted on the upper end of a standard 81 with a miter joint and a tubular depending sleeve 84 is similarly mounted at its upper end on the other end of overhanging arm 83 with a miter joint.

Overhanging arm 83 has a boss 85 (FIGURE 4) mounted therein at its outer end and disposed generally centrally of depending sleeve 84. A bar 86 has its upper end mounted in boss 85 by a set screw or pin 87 and extends downwardly along the longitudinal center line of sleeve 84 and terminates below the lower end of sleeve 84.

A tubular shaft 90 surrounds bar 86 and is journaled for rotation in spaced bearings 91 mounted in depending sleeve 84 by suitable screws 92. A bevel gear 93 is drivingly mounted on the upper end of shaft 90 and is disposed in mating relation with a bevel gear 94 mounted on one end of a shaft 95 for rotation therewith. Shaft 95 is journaled for rotation in spaced bearings 96 mounted in overhanging arm 83 by suitable screws 97.

A sprocket 100 is drivingly mounted on the other end of shaft 95 and supports the upper end of a sprocket chain 101 which extends generally vertically through upright standard 81. The lower end of sprocket chain 101 is drivingly supported by a sprocket 102 (FIGURE 1) mounted on the output shaft 103 of a motor 104. Motor 104 has a base portion 104a thereon by which the same is mounted by suitable bolts 105a on a bracket 105 which is in turn mounted on upright frame members 24 and top frame portion 25.

Feeding means 106 is provided for clampingly receiving a plurality of hosiery blanks B and successively feeding the same to seaming machine 34 and includes a generally circular plate 107 mounted on the lower end of shaft 90 for rotation therewith by a suitable boss 110 and set screw 111 (FIGURE 3) and has one side thereof disposed closely adjacent to the curved portion 44b of throat plate 44 and the curved portion 57a of work support plate 57, which curved portions are generally concentric therewith, so that the hosiery blank feeding means 106 passes in close proximity to needles 45 of seaming machine 34. Circular plate 107 has a plurality of cutouts therein, preferably five, spaced equidistantly around the periphery thereof and each being formed by a cut line 112, which comprises a predetermined segment of a chord of circular plate 107 disposed at a predetermined angle relative to a tangent to the periphery of plate 107 at the juncture of cut line 112 therewith, and a cut line 113 generally perpendicular to cut line 112.

Figure 9:
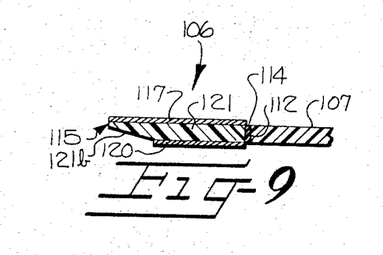
FIGURE 9 is an enlarged fragmentary sectional view taken substantially along line 9—9 in FIGURE 3.

Preferably, a strip 114 (FIGURES 3 and 9) of any suitable material having a high coefficient of friction is mounted on circular plate 107 along each cut line 112 by any suitable means such as adhesive (not shown) and such strips 114 form one jaw of clamping means for the hosiery blanks B. However, it should be understood that the portions of circular plate 107 defined by cut lines 112 may form the one jaw of the clamping means without any facing strip without departing from the scope of the present invention.

A movable jaw 115 is pivotally mounted on plate 107 at each cutout by a screw 116 and forms the other jaw of each of the clamping means. Each of the movable jaws 115 comprises upper and lower arc-shaped plates 117, 120 which are disposed on opposite sides of an inner core 121 and all of which are held in assembled relation by rivets 122. Inner cores 121 are preferably formed of the portions of circular plate 107 removed by the cut lines 112 and 113 with one end thereof being cut away along lines 121a to permit jaws 115 to pivot outwardly about screws 116. Also, the outer peripheral portion of each inner core 121 is preferably beveled inwardly as indicated at 121b. In this regard, lower plates 120 are smaller than upper plates 117 so that the circular plate 107 may be disposed in close proximity to throat plate 44 and work support plate 57. It is noted that the curved periphery of movable jaws 115 is concentric with circular plate 107 and passes in close proximity to needles 45 of seaming machine 34 so that the seams S in hosiery blanks B are formed closely adjacent to this periphery and along a curved line concentric therewith, but in spaced relation to the portions of the hosiery blanks clamped between jaws 114 and 115.

Figure 5:
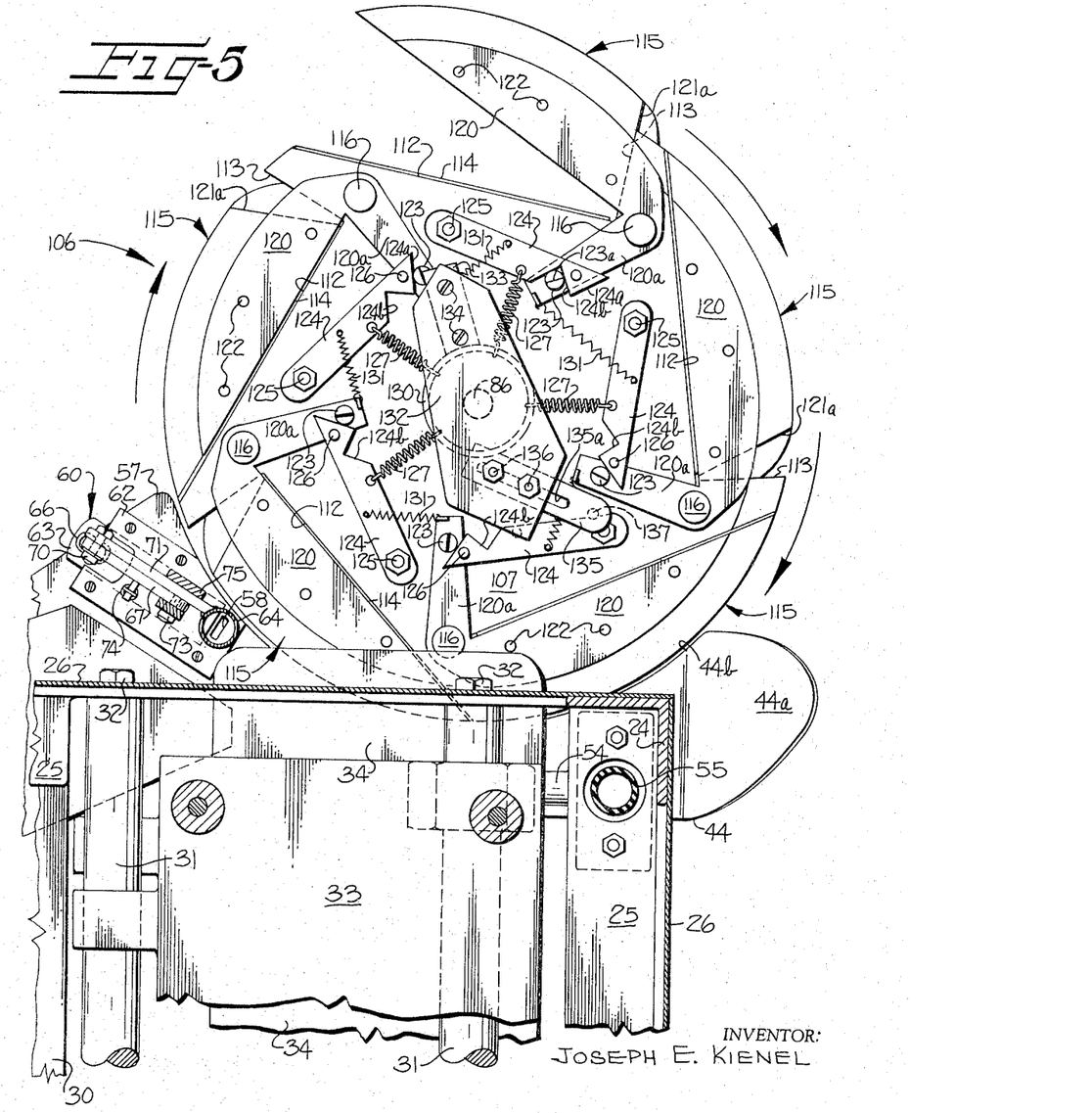
FIGURE 5 is an enlarged fragmentary sectional bottom plan taken substantially along line 5—5 in FIGURE 1.

The lower plate 120 of each of the movable clamping jaws 115 has an arm portion 120a (FIGURE 5) formed integral therewith and extending generally perpendicular to the remaining portion thereof on the opposite side of screw 116. Arm portion 120a has a depending pin 123 mounted thereon which is flattened on one side thereof as indicated at 123a, which is the leading side thereof relative to the direction of rotation of circular plate 107 with shaft 90.

An elongate latch member 124 for each of the movable jaws 115 is pivotally mounted at one end on the lower surface of circular plate 107 by a bolt 125 and has the other end thereof beveled to form a cam portion 124a thereon which is disposed closely adjacent pin 123 when movable jaw 115 is in closed or clamping position and in the path of travel of pin 123 when movable jaw 115 is moved to the open or unclamping position. Each of the latch members 124 has a V-shaped recess or cutout 124b in the inner side thereof which receives pin 123 when movable jaw 115 is moved to open position and holds movable jaw 115 in this open position and has a depending pin 126 mounted thereon adjacent the cam portion 124a thereon.

Tension springs 127 (FIGURE 5) are connected at one end to latch members 124 and are connected at their other ends to a collar 130 mounted on circular plate 107 for biasing latch members 124 inwardly toward pins 123 on the movable jaws 115. Tension springs 131 are connected at one end to arm portions 120a on movable jaws 115 and are connected at their other ends to the latch members 124 for the next adjacent movable jaws 115 for biasing the movable jaws toward closed position.

A plate 132 (FIGURES 4 and 5) is mounted on the lower end of bar 86 below circular plate 107 and is stationary relative to the rotating circular plate 107. An upstanding abutment 133 is mounted on plate 132 at one end thereof by suitable screws 134 in the path of the flattened sides 123a of pins 123 on the arm portions 120a of the movable clamping jaws 115 for moving jaws 115 to the open position. A bar 135 has an elongate opening 135a extending longitudinally thereof through which penetrate suitable bolts 136 which also penetrate through plate 132 and thereby adjustably mount bar 135 on the opposite end of stationary plate 132 from abutment 133. An upstanding pin 137 is mounted on bar 135 adjacent its outer end and in the path of travel of the pins 126 on the latch members 124 for pivoting the latch members 124 outwardly and thereby releasing the pins 123 of the movable clamping jaws 115 from the recesses or cutouts 124b therein.

It is noted that hosiery blank feeding means 106 may be used to feed separate hosiery blanks B which are successively clamped thereon and also may be used to feed hosiery blanks, usually a dozen, which are secured together into a bundle (FIGURE 2). When the apparatus of the present invention is to be used to seam hosiery blanks in bundles, a shelf 138 is preferably provided on base 21 beneath hosiery blank feeding means 106 a distance less than the length of the hosiery blanks for supporting a portion of the bundle of hosiery blanks to reduce the weight thereof on the clamping jaws 114 and 115.

Figure 10:
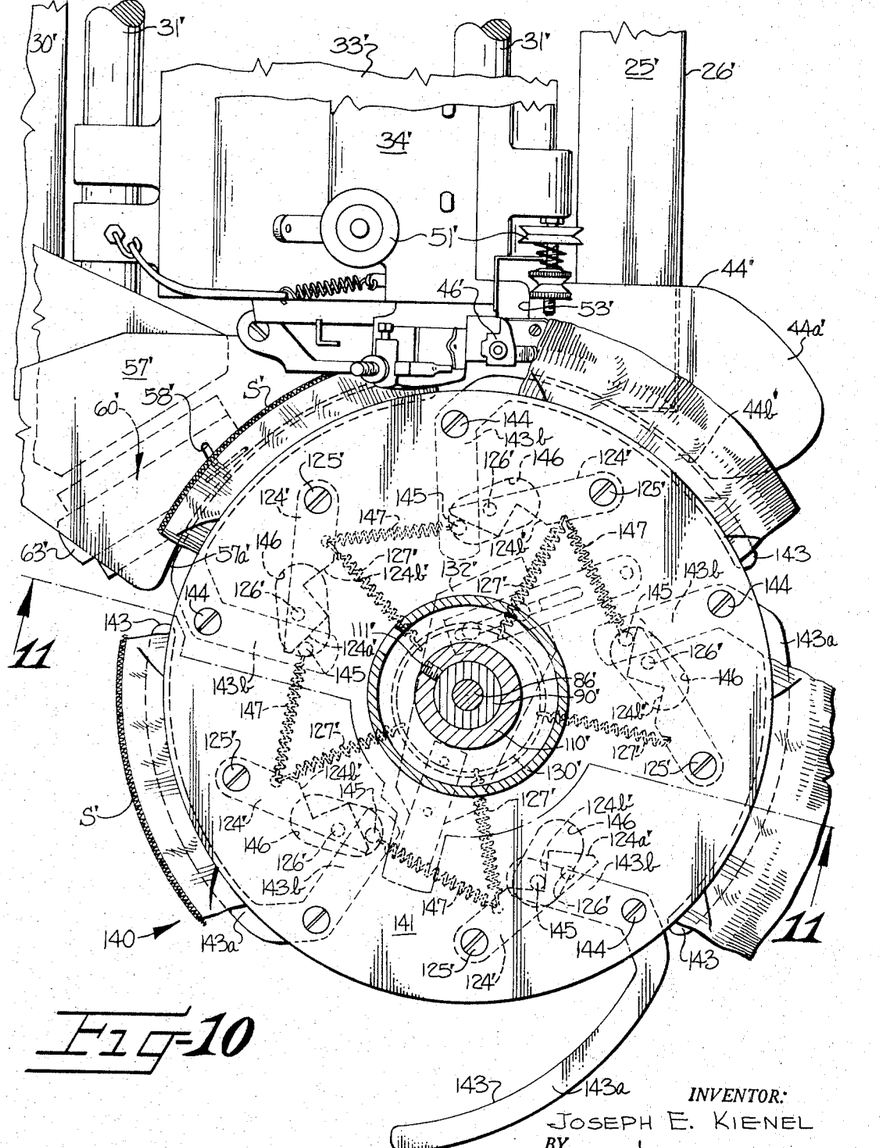
FIGURE 10 is a view similar to FIGURE 3 of another embodiment of the apparatus of the present invention.
Figures 11, 12:
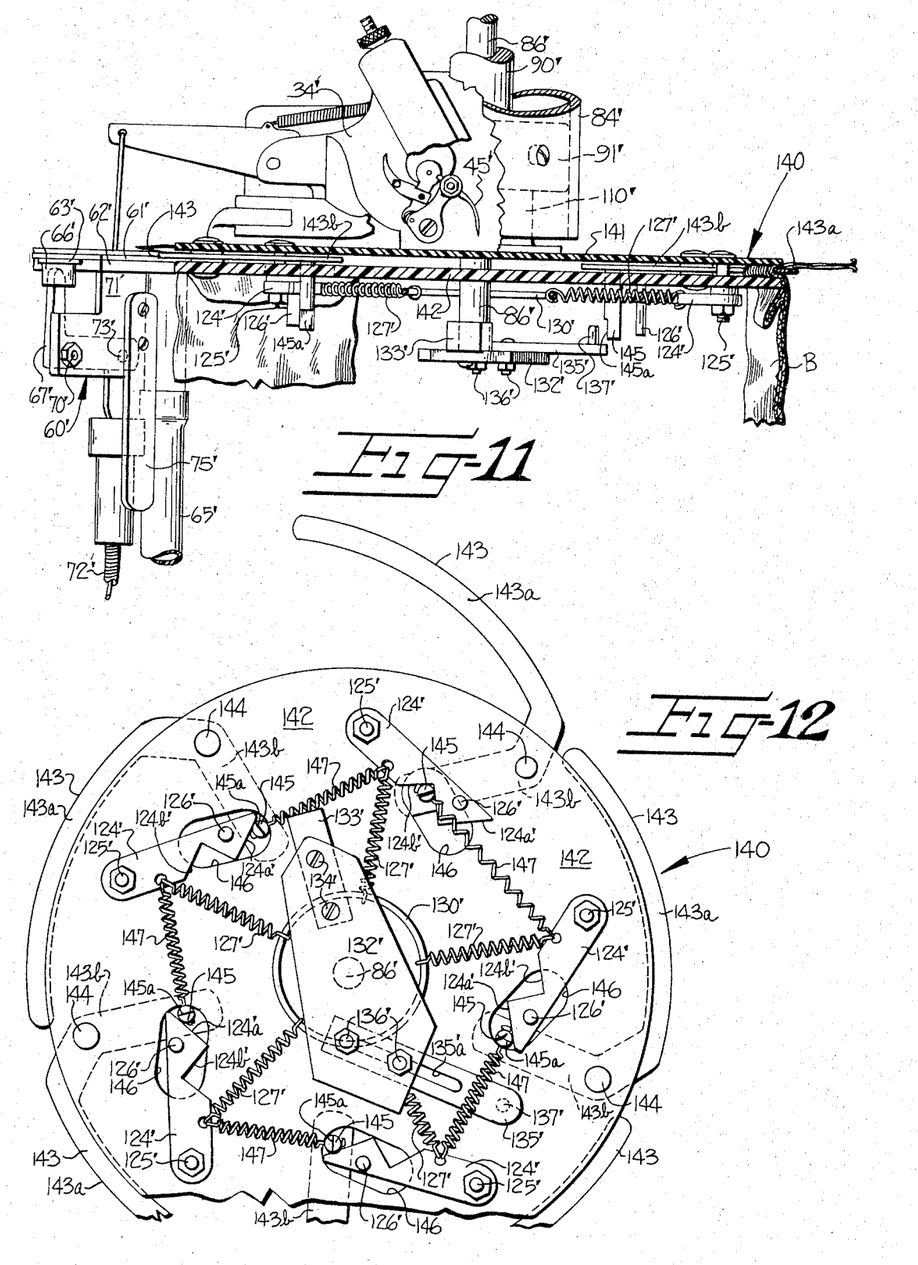
FIGURE 11 is a fragmentary sectional view taken substantially along line 11—11 in FIGURE 10.
FIGURE 12 is a fragmentary bottom plan view of the apparatus shown in the right-hand portion of FIGURE 11.

Referring now to FIGURES 10 through 12 of the drawings wherein another embodiment of the hosiery blank feeding means of the present invention is shown and wherein like reference characters with the prime notation added are used to designate like parts, this hosiery blank feeding means is generally indicated at 140 and includes a pair of spaced superposed interconnected circular plates 141 and 142 mounted on the lower end of shaft 90' for rotation therewith and having one side thereof disposed in close proximity to curved portion 44b' of throat plate 44' and curved portion 57a' of work support plate 57'. Spaced circular plates 141 and 142 define a groove around the periphery thereof, and spaced portions of these plates at this groove form one jaw of a plurality of hosiery blank clamping mechanisms.

A plurality of generally L-shaped, movable jaws 143 have one leg 143a thereof curved, with substantially the same radius as circular plates 141 and 142, and the other leg 143b thereof disposed between plates 141 and 142 and pivotally mounted thereon by screws 144. It is noted that screws 144 also serve to interconnect plates 141 and 142. A pin 145 is mounted on the inner end of leg 143b of each of the movable jaws 143 and depends therefrom through an elongate opening 146 formed in lower plate 142, which opening permits movement of pin 145 therein as movable jaw 143 pivots about screw 144 and one end of which serves as a stop for pin 145 to limit movement of jaw 143 to the closed position. Pins 145 are flattened as indicated at 145a on the leading side thereof relative to the direction of rotation of the circular plates 141 and 142.

Latch members 124' are pivotally mounted on circular plate 142 by bolts 125' and include cam portions 124a' adjacent pins 145 and have recesses or cutouts 124b' in the inner side thereof for receipt of the pins 145 when jaws 143 are moved to open position to maintain the movable jaws 143 in this open position. Latch members 124' have pins 126' mounted thereon and have tension springs 127' connected thereto which are also connected to a collar 130 mounted on circular plate 142. Tension springs 147 are connected at one end to pins 145 and are connected at their other ends to the latch member 124' for the next adjacent movable jaw 143 for biasing the movable jaws 143 toward the closed position.

A stationary plate 132' is mounted on the lower end of bar 86' and has an upstanding abutment 133' thereon in the path of the flattened portions 145a of pins 145 on the movable jaws 143. Stationary plate 132' also has an arm 135' adjustably mounted thereon which has an upstanding pin 137' mounted on its outer end which is disposed in the path of travel of pins 126' depending from the outer end portions of the latch members 124'.

It is noted that hosiery blank feeding means 140 is readily removable from shaft 90' and is readily replaceable by hosiery blank feeding means 106 and vice versa. Therefore, apparatus 20 is capable of closing one end of either the circular knit hosiery blanks having fashioned gussets defining a toe pocket or the tube-type circular knit hosiery blanks by selective use of the hosiery blank feeding means 106 and 140.

Figure 13:
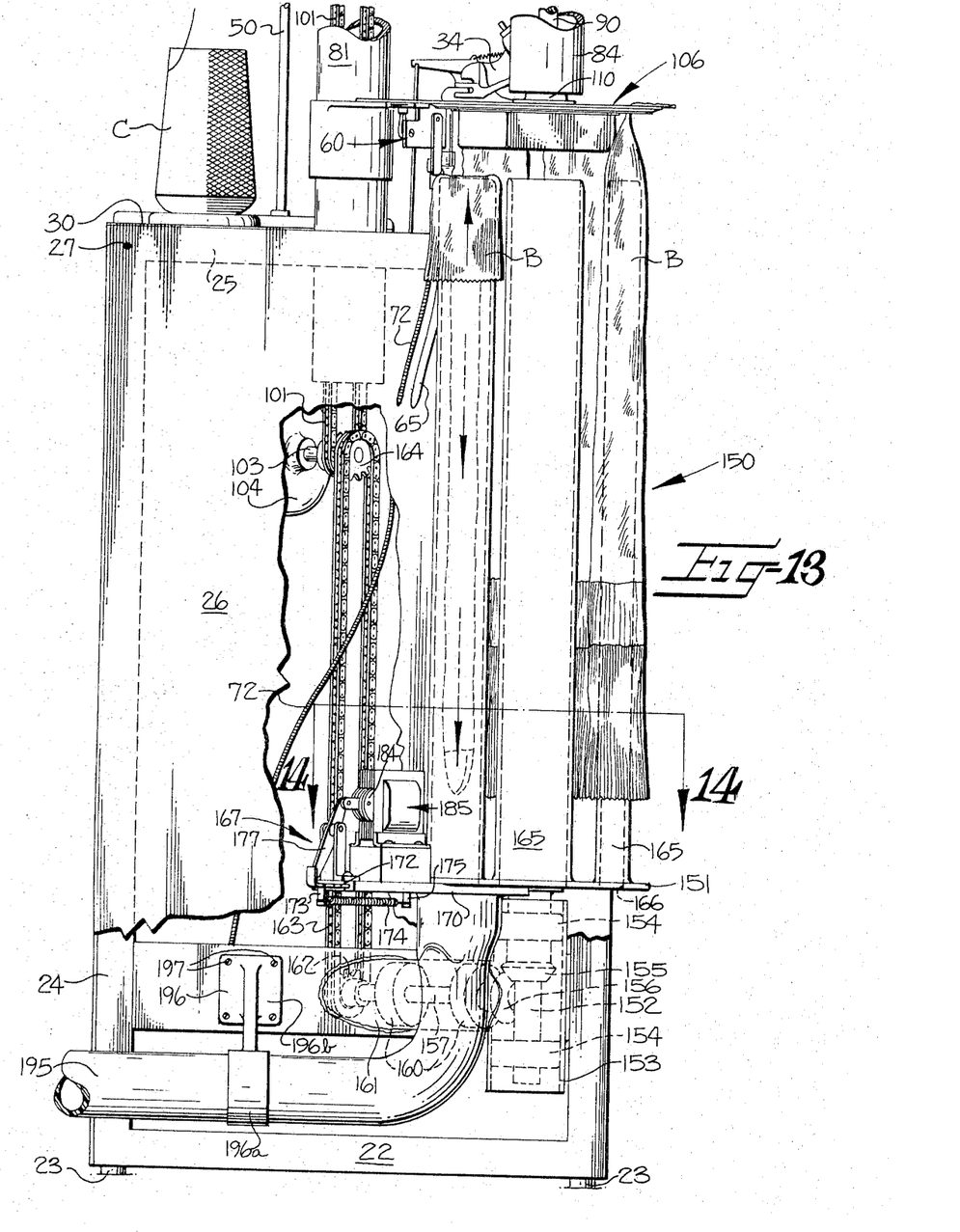
FIGURE 13 is a fragmentary side elevational view of another modified form of the present invention with portions broken away for clarity.
Figure 14:
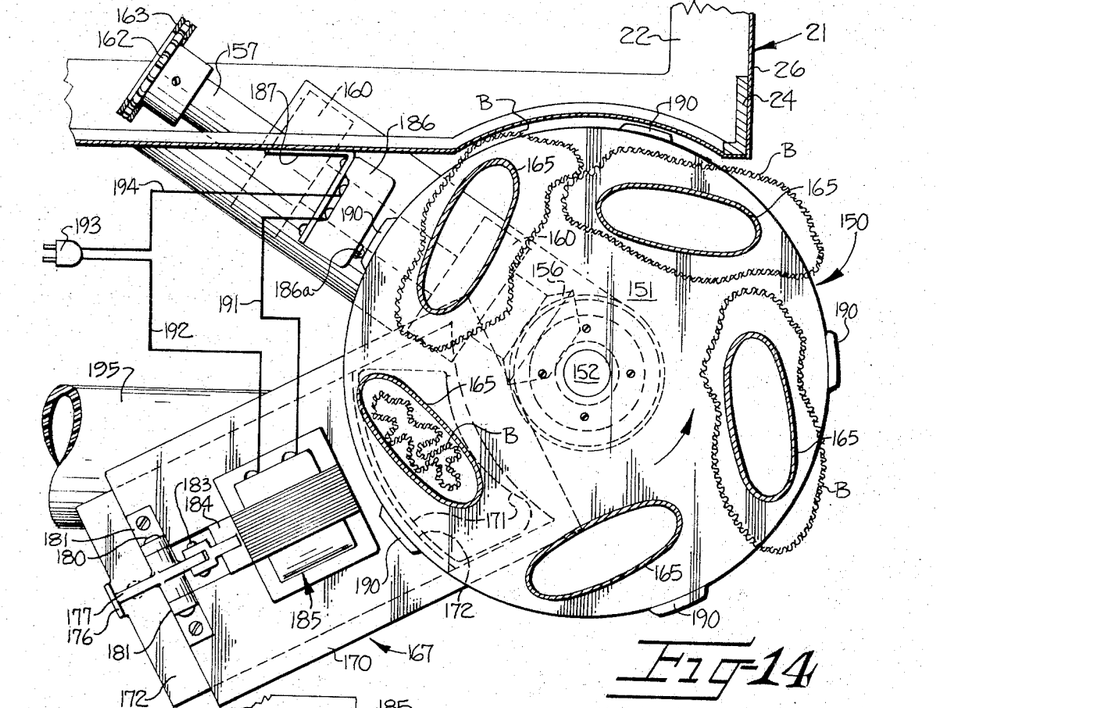
FIGURE 14 is an enlarged fragmentary sectional view taken substantially along line 14—14 in FIGURE 13.

Referring now to FIGURES 12–14, there is shown a hosiery blank everting mechanism 150 which may be used with either of the hosiery blank feeding means 106 or 140 described above, but for simplicity of description, will be described in connection with hosiery blank feeding means 106. Everting mechanism 150 includes a turntable 151 mounted on a shaft 152 for rotation therewith which is journaled for rotation in a tubular standard 153 by spaced bearings 154. A bevel gear 155 is drivingly mounted on shaft 152 and is disposed in mating relation with a bevel gear 156 which is mounted on one end of a shaft 157. Shaft 157 is journaled for rotation in spaced bearings 160 mounted in a tubular support member 161 which in turn is mounted on base 21 at one end and has standard 153 fixedly mounted on the other end thereof.

A sprocket 162 is drivingly mounted on the other end of shaft 157 and supports one end of a sprocket chain 163 which extends upwardly therefrom and is supported at its other end by a sprocket 164. Sprocket 164 is mounted on the output shaft 103 of the motor 104 which drives hosiery blank feeding means 106 for rotating turntable 151 at the same angular velocity as hosiery blank feeding means 106.

A plurality of upstanding tubular everting forms 165 are mounted on turntable 151 for rotation therewith and are equal in number to the clamping mechanisms on circular plate 107 and are disposed directly therebeneath. Form members 165 are preferably elongate in cross-section (FIGURE 14) with the longest cross-sectional dimension thereof disposed at an acute angle to a tangent to turntable 151 to facilitate the placement of the hosiery blanks on the form members.

Turntable 151 has openings 166 therein in alinement with the openings through form members 165. A valve mechanism 167 is disposed at one side of turntable 151 rearwardly of seaming machine 34 relative to the direction of rotation of turntable 151 and has one end thereof disposed beneath turntable 151. Valve mechanism 167 includes a housing 170 (FIGURE 14) having an opening 171 therein which is elongate along a curved line concentric with the axis of turntable 151 and of a lateral width substantially the same as the lateral width of openings 166 in turntable 151 and which is disposed beneath turntable 151 in such a position that openings 166 will successively move into vertical alinement therewith as turntable 151 rotates. A plate-like valve member 172 is slidably mounted in housing 170 for movement between a first or retracted position wherein the inner end thereof closes opening 171 through housing 170 and a second or extended position wherein the inner end thereof is out of closing relation to opening 171 through housing 170.

Figure 15:
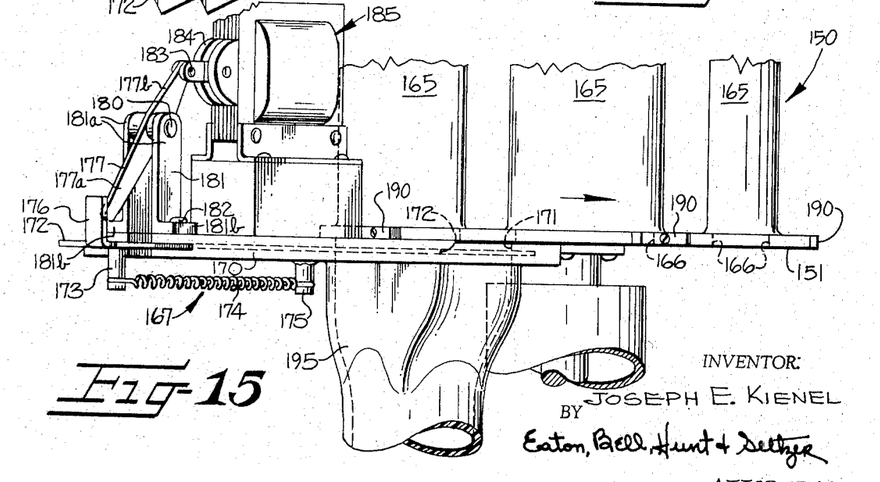
FIGURE 15 is an enlarged fragmentary elevation of the portion of the apparatus shown in the lower medial portion of FIGURE 13.

A depending pin 173 (FIGURE 15) is mounted on slidable valve member 172 and has one end of a tension spring 174 connected thereto, the other end of which is connected to a depending pin 175 mounted on the lower surface of housing 170 for biasing slidable valve member 172 toward the retracted position. An upstanding bracket 176 is formed integral with or mounted on the outer end of slidable valve member 172 and is disposed in the path of movement of one end 177a of an actuating arm 177. Actuating arm 177 is pivotally mounted intermediate its ends on a pivot pin 180 which is mounted at its opposite end in upstanding legs 181a of generally L-shaped brackets 181 which have horizontal legs 181b mounted on housing 170 by suitable screws 182. The other end 177b of actuating arm 177 is pivotally connected by a pin 183 to a plunger 184 of a solenoid 185.

A microswitch 186 (FIGURE 14) is mounted on a bracket 187 which in turn is mounted on base 21. Microswitch 186 includes an actuating plunger 186a which is disposed adjacent to turntable 151 and in the path of travel of a plurality of protruding cam members 190 mounted on the periphery of turntable 151 for rotation therewith. Cam members 190 are mounted on turntable 151 relative to form members 165 such that one of the cam members will contact plunger 186a and close microswitch 186 when each of the form members 165 is disposed over the opening 171 in housing 170 of valve mechanism 167.

Microswitch 186 is connected by a line 191 to one side of solenoid 185, the other side of which is connected by a line 192 to one side of a suitable male plug 193 adapted to be inserted in any suitable receptacle (not shown) which is connected to a source of electrical power (also not shown). A line 194 connects the other side of male plug 193 to microswitch 186 to complete the circuit.

A conduit 195 is connected at one end to housing 170 of valve mechanism 167 in communication with opening 171 therein and is connected at its other end, in a manner not shown, to vacuum source 56 so that a suction is pulled on opening 171 and on the interior of form members 165 when the slidable valve member 172 is in the extended position. Conduit 195 is mounted on base 21 intermediate its ends by a suitable bracket 196 (FIGURE 13) which has a portion 196a extending around the conduit and a portion 196b mounted on base 21 by suitable screws 197.

In operation, apparatus 20 is placed in operation by actuation of a master control switch (not shown) and seaming machine 34 will operate continuously until such master control switch is deactivated. In this regard, the needles 45 of seaming machine 34 and other stitch forming instrumentalities (not shown) will operate to form a continuous seaming stitch chain which will extend between successive hosiery blanks. At the same time, motor 104 operates through a drive train including sprocket 102, sprocket chain 101, sprocket 100, shaft 96, bevel gears 94 and 93, and shaft 90 to continuously rotate circular plate 107 of the hosiery blank supporting and feeding means 80 in timed relation to seaming machine 34.

It is noted that hosiery blank feeding means 106 is particularly adapted for seaming the aforementioned tube-type hosiery blanks wherein a curved seam is formed which extends from a starting point at one side of a flattened end portion of the hosiery blank along a curved line laterally of the hosiery blank to an ending point on the other side thereof and which is spaced longitudinally of the hosiery blank from the starting point. This curved seam will lie beneath the foot portion of the hosiery blank when the same is finished. Usually, this tube-type of hosiery blank has a reinforced area knitted adjacent the end to be closed and this reinforced area is normally formed of a yarn of larger size than the yarn which is normally employed in the remaining portion of the hosiery blank. The reinforcing area of the hosiery blank is interknit with the remaining portion of the hosiery blank along a line extending transversely across the hosiery blank.

To position a hosiery blank on the hosiery blank feeding means 106, an operator has only to flatten the end portion to be seamed with the portion which will define the toe of the finished hose at one side and then to place the flattened end portion between one of the pairs of clamping jaws 114 and 115 in such a position so that the jaws will clamp the hosiery blank transversely of the flattened end portion along a line parallel to the juncture line between the reinforced portion and the remaining portion of the hosiery blank in spaced relation to the line along which the hosiery blank will be seamed. It is noted that the hosiery blank is placed in the clamping jaws 114 and 115 with the portion which will form the toe portion of the hose when finished closest to seaming machine 34 (FIGURE 3) and the clamped portion extends along a straight line forming a segment of a chord of the curved path of travel of the hosiery blank with circular plate 107 past seaming machine 34.

Movable jaw 115 is held in open position by its latch member 124 by means of pin 123 on movable jaw 115 and the V-shaped recess 124b in latch member 124 for receipt of a hosiery blank and when such a hosiery blank is properly positioned between the jaws 114 and 115, the operator may manually move jaw 115 inwardly into co-operating relation with jaw 114 to clamp the hosiery blank therebetween or the operator may hold the hosiery blank in position until pin 126 on the latch member 124 engages stationary pin 137 and pivots latch member 124 out of latching engagement with pin 123 on jaw 115 and thereby permits spring 131 to move jaw 115 to closed position. It is noted that if a hosiery blank is not positioned between a pair of jaws 114 and 115, the movable jaw 115 will be moved to closed position in this manner before the same reaches seaming machine 34.

The reinforced portion to be seamed is then either folded downwardly by the operator or usually when released by the operator will fall into substantially perpendicular relation to the remaining portion of the hosiery blank and into superposed relation with the movable clamping jaw 115 with the portion to be seamed extending outwardly beyond the periphery of the clamping jaw 115 in a substantially horizontal plane and generally radially of circular plate 107. It is noted that this operation of properly positioning a hosiery blank on feeding means 106 is easily and very quickly performed by the operator and, in fact, is so quickly and easily accomplished that an operator usually may properly attend more than one seaming machine.

As plate 107 continues to rotate, the thusly clamped and positioned hosiery blank is carried therewith and the portion thereof to be seamed is moved onto throat plate 44 of seaming machine 34 and beneath the presser foot 46 thereof. Knife 47 then severs the portion to be seamed along a curved line concentric with the curved path of travel thereof and concentric with circular plate 107 and closely adjacent to the periphery of clamping jaw 115. The excess material removed by knife 47 is carried away by suction through opening 53 in throat plate 44, conduit 54 and hose 55 to a suitable collection means (not shown) adjacent vacuum source 56.

Immediately thereafter, needles 45 and the other stitch forming instrumentalities of seaming machine 34 cooperate to form an overedge seam S around the cut edges of the hosiery blank B to close this end of the hosiery blank. The seamed hosiery blank B is carried rearwardly of the seaming machine 34 by circular plate 107 and jaws 114 and 115 thereon onto work support plate 57. The projecting seaming stitch chains on both the leading and trailing sides of the seamed hosiery blank successively pass over the opening 58 in work support plate 57 and are drawn downwardly through this opening by the suction applied thereto from vacuum source 56. The continuously operating cutter mechanism 60 serves to sever these seaming stitch chains and the same are drawn off to a waste collection means (not shown) adjacent the vacuum source 56 through hose 66 and conduit 65.

As movable jaw 115 passes rearwardly beyond work support plate 57, the flattened portion 123a of pin 123 on the arm 120a on movable jaw 115 contacts the stationary abutment 133 carried by the plate 132 and, upon continued rotation of plate 107, the movable jaw 115 is moved from the closed position to the open position thereby releasing the hosiery blank from the hosiery blank feeding means 106. As movable jaw 115 moves to the open position, the corresponding latch member 124 is pivoted outwardly about its pivot 125 by engagement of the pin 123 on movable jaw 115 with cam portion 124a on latch member 124. Pin 123 then moves out of engagement with the cam portion 124a and enters the V-shaped recess 124b in the latch member 124 in which the same is retained by the spring 127 to maintain the movable jaw 115 in open position for receipt of the next hosiery blank to be seamed.

The embodiment of the present invention illustrated in FIGURES 10 through 12 is particularly adapted for use in the seaming of hosiery blanks wherein fashion gussets are formed to define a toe pocket at one end of the hosiery blank and wherein there is normally formed a plurality of looper courses. This embodiment of the present invention operates similarly to the embodiment illustrated in FIGURES 1 through 8 and described above except that the clamping jaws of the clamping mechanisms of hosiery blank feeding means 140 are curved along a line concentric with the curved path of travel thereof.

To position a hosiery blank of this type on feeding means 140, the looper courses and adjacent portions of the hosiery blank to be seamed are flattened and the flattened portion is placed against the periphery of the circular plates 141 and 142, and movable jaw 143 is moved into clamping engagement therewith either manually or by pin 137' engaging pin 126' on latch member 124'. The hosiery blank will therefore be clamped along a curved line and the clamped portion will assume a curved configuration concentric with circular plates 141 and 142. Also, the portion to be seamed of the hosiery blank extends outwardly from the clamped portion and is also curved and therefore the curved seam formed by seaming machine 34' will be a substantially straight seam across the hosiery blank when the hosiery blank is removed from hosiery blank feeding means 140.

As was the case with the embodiment discussed above, the clamped hosiery blank has the portion to be seamed extending generally radially of circular plate 141 and 142 and outwardly beyond the periphery of movable clamping jaw 143. This portion of the hosiery blank is moved past seaming machine 34' upon rotation of hosiery blank feeding means 140 and knife 47' of seaming machine 34' removes the terminal portions or looper courses from the hosiery blanks moved thereby and needles 45' and the other stitch forming instrumentalities of seaming machine 34' form an overedge seam over the thusly cut edges.

The projecting seaming stitch chains (not shown) on each of the hosiery blanks are severed by cutting mechanism 60' and the hosiery blank is removed from the hosiery blank feeding means 140 by engagement of the flattened portion 145a of pin 145 on the movable jaw 143 with the stationary abutment 133'. It is noted that each movable jaw 143 is held in the open position by pin 145 being received in the V-shaped recess 124b' in its corresponding latch member 124' for facilitating the positioning of successive hosiery blanks on the hosiery blank feeding means 140.

Both of the embodiments illustrated in FIGURES 1 through 9 and in FIGURES 10 through 12 readily lend themselves for use in the seaming of hosiery blanks fastened together into a bundle. When so used, the end portions to be seamed of at least some of the hosiery blanks in the bundle are initially clampingly positioned on the hosiery feeding means 106 or 140 and the remaining portions of these hosiery blanks and the remaining hosiery blanks in the bundle, if any, depend generally vertically downwardly from the hosiery feeding means and rotate therewith as the hosiery feeding means moves the end portions to be seamed to and through the seaming machine. It is noted that shelf 138 supports a portion of the weight of the bundled hosiery blanks to relieve this portion of the weight from the clamping jaws on the hosiery blank feeding means. Following seaming of the initially positioned hosiery blanks in the bundle, these hosiery blanks are removed from the feeding means and the remaining hosiery blanks in the bundle, if any, are then successively positioned on the hosiery blank feeding means until all of the hosiery blanks in the bundle are seamed. The operation is then repeated for subsequent bundles.

Both of these embodiments are also usable in conjunction with hosiery blank everting mechanism 150 and, when so used, each hosiery blank is placed over an everting form member 165 prior to being clamped on the hosiery blank feeding means 106 or 140 and the forms 165 are moved around therebeneath by turntable 151 at the same angular velocity as the feeding means. The forms 165 also lend themselves for having the seaming machine operator inspect the hosiery blanks as the same are being seamed, if this is desired.

Immediately upon release of a seamed hosiery blank from the hosiery blank feeding means 106 or 140, the same drops downwardly until the toe portion thereof rests on the upper end of the everting form member 165. About this time, form member 165 moves into overlying relation to the opening 171 in housing 170 of the valve mechanism 167 and the solenoid 185 is energized by the microswitch 186 which is actuated by one of the cam portions 190 on turntable 151.

When energized, solenoid 185 moves slidable valve member 172 to the open position by the actuating arm 177 and against the action of the spring 174. Since a continuous suction is being drawn on the valve mechanism 167 through the conduit 195 from vacuum source 56, a suction is drawn on the interior of the form member 165 as soon as the valve member 172 moves out of underlying relation thereto and pulls the toe portion of the seamed hosiery blank downwardly into the tubular form member 165 (FIGURE 13) and thereby everts the hosiery blank. The hosiery blank is then drawn downwardly through the tubular form member 165, valve mechanism 167 and conduit 195 and into a suitable collection means (not shown) at vacuum source 56.

When the corresponding cam portion 190 moves out of engagement with the plunger 186a of microswitch 186, solenoid 185 will be deenergized and spring 174 will return the slidable valve member 172 to the closed position which will shut off the suction from the form member 165 so that another hosiery blank may be placed thereon. The operation is repeated for successive hosiery blanks so long as the seaming apparatus is in operation.

It will therefore be apparent that a novel hosiery blank seaming apparatus and method are provided wherein a highly skilled operator is not required and wherein a higher degree of uniformity is achieved in successively seamed hosiery blanks and wherein the seamed hosiery blanks may be everted immediately following the seaming thereof without additional manual handling thereof.

In the drawings and specification there have been set forth preferred embodiments of the invention and, although specific terms are employed, they are used in a generic and descriptive sense only and not for purposes of limitation, the scope of the invention being defined in the claims.

I claim:

1. A method of seaming and everting tubular hosiery blanks having a welt at one open end thereof and a toe forming portion at the other open end thereof adapted to be closed by seaming to form the toe of the hosiery, said method utilizing at least one elongate form having a free end and a generally axially extending opening therein communicating at one end thereof with the free end of the form, said method comprising
   (a) drawing a tubular hosiery blank welt first onto the elongate form over the free end thereof,
   (b) seaming the toe forming portion of the tubular hosiery blank while on the form to close the same and form the toe portion of the hosiery blank, and
   (c) creating suction currents in the axial opening in the form to draw the seamed tubular hosiery blank through the form, seamed end first, to evert the seamed hosiery blank.

2. A method according to claim 1 wherein the suction currents are created in the axial opening in the form only after the seaming of the hosiery blank on the form has been completed to prevent the suction currents from interfering with the seaming operation.

3. A method according to claim 1 wherein the elongate form is a movable form and including
   (d) moving the form to a hosiery blank mounting position prior to drawing the hosiery blank thereonto and then moving the form and hosiery blank thereon to a seaming position for seaming of the hosiery blank.

4. A method according to claim 3 wherein a plurality of elongate forms are provided and these forms are successively moved from the hosiery mounting position to the seaming position for the successive seaming and then eversion of hosiery blanks carried thereby.

5. A method of seaming and everting tubular hosiery blanks according to claim 1 including
   (d) clampingly supporting the toe forming portion of the hosiery blank in a generally horizontal plane, while
   (e) feeding the toe forming portion to and through a seaming means along a generally curved path of travel.

6. A method of seaming one end portion of circular knit tubular hosiery blanks utilizing a seaming machine comprising the steps of
   (a) successively positioning a plurality of hosiery blanks in a predetermined serial arrangement while
   (b) supportingly engaging the hosiery blanks in spaced relation to the end portions to be seamed and while supporting the end portions to be seamed in a substantially horizontal plane, and the remainder in a generally vertical plane,
   (c) successively moving the serially arranged hosiery blanks to and through the seaming machine while
   (d) seaming the hosiery blanks along the terminal portions of these end portions, and
   (e) releasing and removing the seamed hosiery blanks from the predetermined serial arrangement.

7. A method according to claim 6 wherein the hosiery blanks are clampingly engaged in spaced relation to the end portions to be seamed.

8. A method of seaming one end portion of tube type circular knit hosiery blanks according to claim 6 wherein the hosiery blanks are successively moved through a curved path of travel to and through the seaming machine and each hosiery blank is supportingly engaged in spaced relation to the end portion thereof to be seamed along a segment of a chord of the curved path of travel, the supportingly engaged portion of the hosiery blank being closer to the line along which the hosiery blank is to be seamed at one end than at the other end thereof.

9. A method of seaming circular knit hosiery blanks having fashion gussets forming toe portions therein according to claim 6 wherein the hosiery blanks are successively moved through a curved path of travel to and through the seaming machine while being seamed along curved lines concentric with the curved path of travel thereof, and wherein the hosiery blanks are supportingly engaged along curved lines concentric with the curved path of travel of the hosiery blank so that the seams formed therein will extend substantially straight across the end portions of the hosiery blanks when the hosiery blanks are removed from the predetermined serial arrangement.

10. A method of seaming one end portion of circular knit hosiery blanks utilizing a seaming machine and wherein a predetermined number of the hosiery blanks are fastened together at a medial portion thereof to form a bundle of hosiery blanks, said method comprising the steps of
    (a) successively positioning hosiery blanks in the bundle with the end portions to be seamed disposed in a substantially horizontal plane and in a predetermined serial arrangement,
    (b) successively moving the horizontally disposed end portions of the hosiery blanks to and through the seaming machine while
    (c) seaming these end portions of the hosiery blanks to close the same, and
    (d) removing the seamed end portions of the hosiery blanks from their predetermined serial arrangement all while maintaining the integrity of the bundle.

11. A method according to claim 10 wherein the remaining portions of the hosiery blanks in the bundle are supported generally vertically, and the horizontally disposed end portions are moved in a generally circular path of travel while the bundle is rotated.

12. A method according to claim 10 including supporting the remaining portions of the hosiery blanks in the bundle generally vertically and including
    (e) supporting the lower portion of the bundle of the hosiery blanks to relieve some of the weight of the bundle from the supportingly engaged portions of the hosiery blanks.

13. A method of seaming and everting tubular hosiery blanks having a welt at one open end thereof and a toe forming portion at the other open end thereof adapted to be closed by seaming to form the toe of the hosiery, said method comprising the steps of
    (a) successively moving a plurality of the tubular hosiery blanks arranged in a predetermined serial arrangement to and through a seaming machine while
    (b) seaming the toe forming portions of the tubular hosiery blanks to close the same,
    (c) successively removing the seamed tubular hosiery blanks from the predetermined serial arrangement while
    (d) everting the seamed tubular hosiery blanks being removed therefrom.

14. A method according to claim 13 wherein the remaining portions of the tubular hosiery blanks are supported generally vertically and are positioned in surrounding relation to tubular form members, wherein the tubular form members are moved concurrently with the movement of the hosiery blanks to and through the seaming machine, and wherein the hosiery blanks are everted by creating suction currents in the tubular form members to draw the hosiery blanks therethrough, seamed end first.

15. Apparatus for the seaming and eversion of tubular hosiery blanks having a welt at one open end thereof and a toe forming portion at the other open end thereof adapted to be closed by seaming to form the toe of the hosiery, said apparatus comprising
    (a) seaming means for feeding the toe forming portion of the tubular hosiery blank along a predetermined line and for seaming and closing this toe forming portion,
    (b) means operatively associated with said seaming means for supporting the tubular hosiery blank with the toe forming portion disposed with its longitudinal extent generally perpendicular to the predetermined line of feed of said seaming means, said supporting means including at least one elongate form having a free end over which the tubular hosiery blank is adapted to be drawn welt first and having a generally axially extending opening therein communicating at one end thereof with the free end of said form, and
    (c) means communicating with the opening in said form for creating a pressure differential therein to draw the seamed tubular hosiery blank through the form, seamed end first, to evert the hosiery blank.

16. Apparatus according to claim 15 wherein said last recited means is a suction creating means and is operable in timed relation to said seaming means to create suction currents in the axial opening in said form only after the seaming of the hosiery blank on the form has been completed.

17. Apparatus according to claim 15 including
    (d) means mounting said form for movement between a hosiery blank mounting position remote from said seaming means wherein the form is adapted to have the hosiery blank positioned thereon and a seaming position wherein the free end of the form is adjacent and operatively associated with said seaming means.

18. Apparatus according to claim 17 wherein there are a plurality of said elongate forms, said forms being mounted in a predetermined serial arrangement for successive movement from the hosiery mounting position to the seaming position for the successive seaming and eversion of hosiery blanks carried thereby.

19. Apparatus according to claim 15 wherein said hosiery blank supporting means includes
    clamping means operatively associated with the free end of said form for clamping the hosiery blank on the form adjacent the toe forming portion of the hosiery blank and for feeding the toe forming portion to and through said seaming means.

20. Apparatus for seaming one end portion of circular knit hosiery blanks comprising
    (a) means for supporting a plurality of hosiery blanks in a serial arrangement for movement in a predetermined path of travel corresponding to the configuration of the seam to be formed therein, said supporting means including clamping means having vertically disposed cooperating clamping faces for clamping the hosiery blanks adjacent to each end portion to be seamed and for supporting the major portion of the hosiery blanks in vertically depending relation and with the end portions to be seamed in a substantially horizontal plane and in projecting relation to said supporting means,
    (b) seaming means operatively associated with and adjacent said supporting means for successively seaming the hosiery blanks along the projecting end portions to thereby close the same, and
    (c) means driving said supporting means for successively feeding the hosiery blanks to and through said seaming means.

21. Apparatus according to claim 20 including
    (d) means mounting said seaming means for horizontal movement toward and away from said hosiery blank supporting means.

22. Apparatus according to claim 20 wherein said supporting means (a) includes
    (1) a plurality of the clamping means, and
    (2) mounting means mounting said plurality of clamping means in a predetermined serial arrangement for movement in a predetermined curved path of travel for successively feeding the hosiery blanks to and through said seaming means.

23. Apparatus according to claim 22 wherein said mounting means comprises a generally circular plate mounted for rotation about a generally vertical axis and wherein said clamping means comprises a plurality of pairs of cooperating clamping jaws spaced radially around said plate, one of said clamping jaws of each of said pairs being defined by an outer portion of the plate and the other clamping jaw of each of said pairs being mounted on said plate for radial movement between a closed position in cooperating relation with said one jaw and an open position spaced outwardly from said jaw.

24. Apparatus according to claim 23 including
    (d) means biasing said jaws toward the closed position, and
    (e) latching means carried by said plate and operatively associated with said pivotally mounted jaws for releasably latching the pivotally mounted jaws in open position to facilitate the placement of hosiery blanks between the clamping jaws.

25. Apparatus according to claim 24 including
    (f) means disposed forwardly of said seaming means relative to the direction of travel of the clamping jaws and operatively associated with said latching means for releasing said latching means so that said biasing means may move said pivotally mounted jaws to the closed position.

26. Apparatus according to claim 24 including means disposed rearwardly of said seaming means relative to the direction of the movement of said clamping jaws and operatively associated with said pivotally mounted jaws for moving said pivotally mounted jaws from the closed position to the open position for releasing the seamed hosiery blanks therefrom and for engaging the pivotally mounted jaws with said latching means.

27. Apparatus according to claim 22 wherein said clamping means comprises cooperating jaws having vertically disposed clamping faces which when in clamping position are disposed along segments of chords of the curved path of travel and having one end thereof disposed adjacent the predetermined seaming line and the other ends thereof disposed at intermediate points along said chords and spaced a greater distance from the predetermined seaming line than said one end of the clamping jaw faces whereby curved seams are formed in the hosiery blanks from starting points at one side thereof to ending points at the other side thereof with the ending points being spaced longitudinally of the hosiery blanks from the starting points.

28. Apparatus according to claim 27 wherein said supporting means includes a substantially circular plate mounted adjacent said seaming means for rotation about a vertical axis, and wherein a plurality of pairs of the cooperating jaws are spaced radially around said plate and carried thereby for movement past said seaming means and having the vertically disposed clamping faces thereof disposed along segments of the chords of the circular plate extending from the periphery of the plate at one end of the clamping jaw faces to the intermediate points spaced inwardly from the periphery of the plate at the other ends of said clamping faces.

29. Apparatus according to claim 22 wherein said clamping means comprises cooperating jaws curved along lines concentric with the curved path of travel to position the clamped portions of the hosiery blanks in a curved configuration concentric with the line along which they are to be seamed so that the thusly formed seams will extend substantially straight across the hosiery blanks when they are removed from the clamping means.

30. Apparatus according to claim 29 wherein said supporting means includes a substantially circular plate mounted adjacent said seaming means for rotation about a vertical axis and a plurality of pairs of the clamping jaws are spaced radially around the periphery of said plate and have the cooperating clamping faces thereof concentric with said circular plate.

31. Apparatus for seaming one end portion of circular knit hosiery blanks comprising
  (a) means for supporting a plurality of hosiery blanks in a serial arrangement for movement in a predetermined path of travel with the end portions to be seamed supported in seaming position and with the opposite end portions of the hosiery blanks and portions adjacent thereto depending from said supporting means,
  (b) seaming means operatively associated with and adjacent the supporting means for seaming the one end portion of the hosiery blanks, and
  (c) everting means disposed immediately below and operatively associated with said supporting means for everting the seamed hosiery blanks removed therefrom.

32. Apparatus according to claim 31 wherein said everting means includes
  (1) a plurality of generally vertical tubular form members movably mounted below said supporting means for receipt therearound of the opposite end portions of the hosiery blanks carried by said supporting means, and
  (2) means operatively connected to said form members for moving the same in timed relation to said supporting means.

33. Apparatus according to claim 32 wherein said everting means includes
  (3) suction means for applying a suction to the interior of said tubular form members for drawing the hosiery blanks therethrough, seamed end first, to evert the seamed hosiery blanks.

34. Apparatus for use with a seaming machine for closing one end portion of circular knit hosiery blanks comprising
  (a) means for supporting a plurality of hosiery blanks in a predetermined serial arrangement for movement in a predetermined curved path of travel, said supporting means including
    (1) a plurality of clamping means for clamping the hosiery blanks adjacent the end portions to be seamed and for supporting these end portions in a substantially horizontal plane with the opposite end portions of the hosiery blanks and portions adjacent thereto depending from the clamping portions, and
    (2) means mounting said plurality of clamping means for successive movement along the curved path of travel, and
  (b) everting means disposed immediately below and operatively associated with said supporting means for everting seamed hosiery blanks removed from said clamping means.

References Cited
UNITED STATES PATENTS

| | | | |
|---|---|---|---|
| 1,575,887 | 3/1926 | Zimmerman | 112—2 |
| 2,208,992 | 7/1940 | Lewis | 112—2 X |
| 2,301,684 | 11/1942 | Davis | 112—63 |
| 2,345,104 | 3/1944 | Dittrich | 112—2 |
| 2,705,014 | 2/1955 | Brownstein | 112—2 |
| 2,705,827 | 4/1955 | Gamache | 26—7 |
| 2,722,903 | 11/1955 | Larkin | 112—2 |
| 2,890,818 | 6/1959 | Harralson | 223—43 |
| 2,899,116 | 8/1959 | Long et al. | 223—43 |
| 2,940,404 | 4/1960 | Damon | 112—203 X |
| 2,979,802 | 4/1961 | Funchion et al. | 223—43 |
| 2,989,934 | 6/1961 | Zeitlin | 112—2 X |
| 3,073,267 | 1/1963 | Reeber et al. | 112—2 |
| 3,083,653 | 4/1963 | McGill | 112—2 |
| 3,090,963 | 5/1963 | Wittman | 112—269 X |
| 3,149,594 | 9/1964 | Buckreus et al. | 112—252 |

FOREIGN PATENTS
240,057  3/1910  Germany.

JORDAN FRANKLIN, *Primary Examiner.*

J. R. BOLER, *Assistant Examiner.*